June 24, 1930.  F. KUDRNA, JR., ET AL  1,767,380
SWITCH FOR AUTOMOBILE BURGLAR ALARM SYSTEMS
Filed Nov. 22, 1926  2 Sheets-Sheet 2
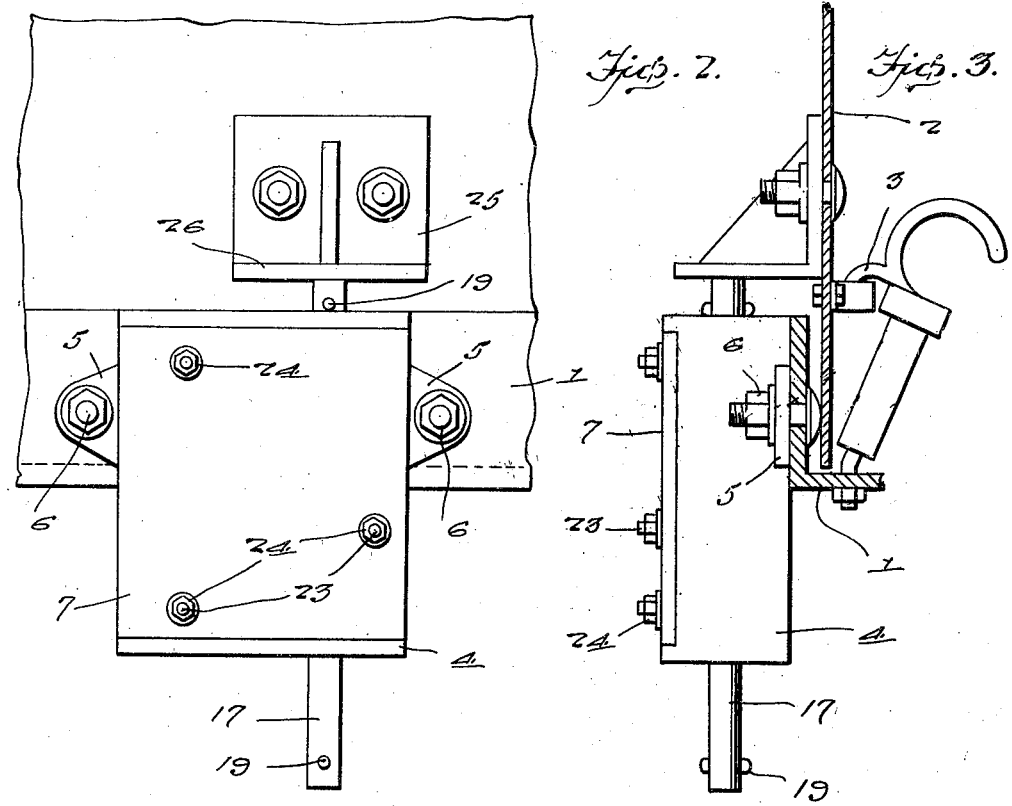
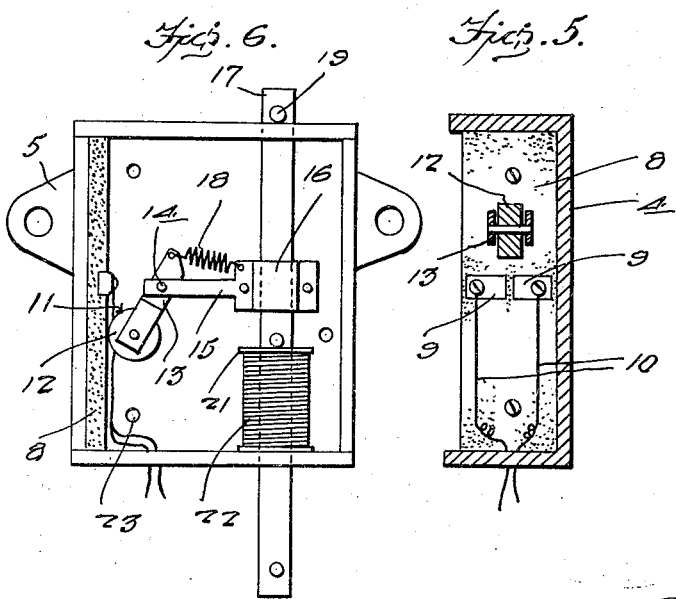
Inventors
F. Kudrna, Jr.
N. Yirkosky
By Clarence A. O'Brien
Attorney Patented June 24, 1930

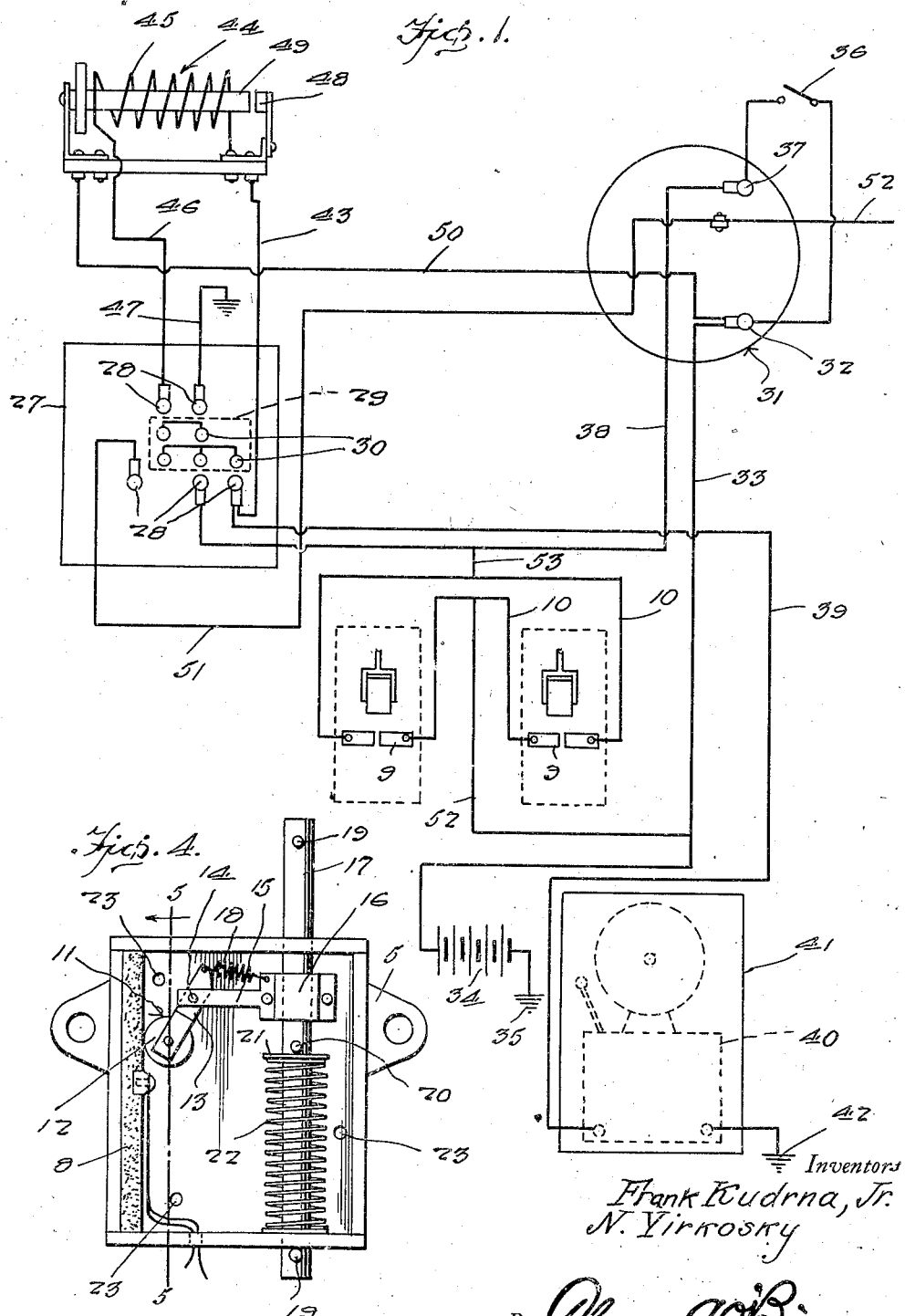

1,767,380

UNITED STATES PATENT OFFICE

FRANK KUDRNA, JR., AND NICHOLAS YIRKOSKY, OF CHICAGO, ILLINOIS

SWITCH FOR AUTOMOBILE BURGLAR-ALARM SYSTEMS

Application filed November 22, 1926. Serial No. 150,049.

This invention relates to an automobile burglar alarm system and circuit controller therefor of the class wherein an alarm circuit is controlled at a plurality of points by suitable circuit closing devices associated with the ignition control switch in such a manner that a separate switch mechanism may be operated by a suitable key mechanism to set the circuit for operation upon unauthorized attempted use of the motor vehicle, while a plurality of other circuit controllers are adapted to additionally operate to close the circuit to the alarm upon tampering with portions of the vehicle covering the motor.

This invention comprehends improvements in the co-pending application Serial No. 100,101, filed April 6, 1926.

The invention comprehends particularly, the provision of a special form of circuit closer for use in conjunction with the system adapted for mounting on the inside of the hood of the motor vehicle for operation thereby in order that the switch will be set in an open position when the hood is in the closed position for ready operation to close the circuits for starting an alarm mechanism when the hood is released and raised or opened after setting of the system for indicating by alarm the unauthorized tampering with the vehicle.

The invention further comprehends the provision of a switch mechanism wherein a closed casing is adapted for attachment inside of the hood covering the motor of a vehicle which is provided with a reciprocating rod normally projected outwardly beyond the casing in one direction, and adapted for projection in the opposite direction by an operating member attached to the hood when the same is in closed position, so that the circuit closer will be set for operation upon the raising of the hood by unauthorized persons.

The invention further comprehends the provision of a system wherein the circuit closers for energizing the alarm circuit will not operate in the ordinary use of the vehicle by authorized persons through the control of the system in preventing energization of the alarm circuit by the circuit makers provided for the control thereof thru the independent control at an independent point, by suitable lock operated means as disclosed in the co-pending application above referred to, which upon predetermined operation will set the alarm circuit for operation by the other circuit closers controlling the same.

The invention comprehends numerous other objects residing in the specific construction and arrangement of the parts for carrying out the invention, it being understood, however, that they are all more particularly described in the following detailed description and the claim directed to a preferred form of the invention, it being understood, however, that various changes in the size, shape, and the relation of the parts may be made without departing from the spirit and scope of the invention as herein set forth.

In the drawings forming part of this application:

Figure 1 is a diagrammatic view showing the wiring connections between the several devices used in the control and operation of the improved alarm system.

Fig. 2 is an inside elevational view of a portion of the motor vehicle, showing one of the chassis bars and a portion of the hood in closed position with the improved circuit closer of this invention applied thereto.

Fig. 3 is a view showing the chassis bar and hood in transverse section and the circuit closer in side elevation, taken at right angles to Fig. 2.

Fig. 4 is a detail view of the circuit closer with the cover plate removed, showing the interior construction thereof.

Fig. 5 is a vertical sectional view taken on the line 5—5 of Fig. 4.

Fig. 6 is a view similar to Fig. 4, showing the circuit closer in such position as illustrated in Figs. 2 and 3, preparatory to operation for closing the alarm circuit.

1 indicates a portion of the frame of an automobile chassis, at the forward portions thereof, and 2 a portion of the hood or other motor cover which seats on the frame, and is held in closed position by suitable latches 3 of well known construction in the art.

The circuit closer forming the principal feature of this invention includes a casing 4 provided with ears 5 projecting from the opposite ends thereof which receive suitable bolts or the like 6 for securing the casing to the frame 1, as illustrated in Figs. 2 and 3. This casing as illustrated in shallow rectangular form and having one open side which removably receives the cover plate 7.

Along one side wall of the casing as shown in Figs. 4 and 6 is mounted the insulating bar or block 8 carrying a pair of spaced contacts 9 as shown in Fig. 5, to which suitable circuit wire connections 10 are made so that a circuit including these contacts will be closed when the movable roller contact 11 engages the contacts 9. This movable contact member 11 includes the contact rollers 12 mounted in the bifurcated end of the arm 13 which is pivotally mounted intermediate its ends at 14 in the laterally extending arm 15 projecting from the clamp member 16 attached to the reciprocating operated rod 17. This operated rod 17 is mounted for sliding reciprocating movement in the end walls of the casing 4, as is clearly illustrated in Figs. 4 and 6, and the roller 12 is normally held in engagement with the insulating block 8 for engagement with the contacts 9 in the reciprocating motion of the rod 17 through the operation of the coiled springs 18 connected with the free ends of the arm 13 and anchored at its opposite end to the clamp member 16 as shown clearly in Fig. 4.

The opposite ends of the operated rod 17 are provided with stop pins 19 adapted for cooperation with the end walls of the casing 4 to limit the reciprocating motion of the rod member, while the central portion is provided with a crosspin 20 forming an abutment for the collar 21 against which engages one end of the operating coiled spring 22 having abutment against the bottom end wall of the casing 4 so that the rod member 17 is normally projected and retained in position shown in Fig. 4.

Upon the application of the cover plate retained in assembled relation with the casing 4 by means of the threaded stud 23, extending through suitable openings in the cover and receiving the securing nuts 24, it will be seen that the contacts 9 and the movable circuits closer 11 with associated parts for operating movable contacts are completely housed within the casing and protected against dirt, water and the like, while the ends of the rod 17 project beyond the casing for suitable control and operation of the switch.

An operating bracket 25 is mounted on the inside of the hood 2 as shown in Figs. 2 and 3, and provided with the laterally extending flange 26 adapted in the closed position of the hood as shown to engage the upper end of the operated rod 17 and move the same downwardly so that the movable contact members assume the position shown in Fig. 6 with the spring 22 compressed.

One of these switches is mounted under each side of the hood on the frame as illustrated in Fig. 2, and one contact of each switch is electrically connected with one contact of the other, as shown clearly in Fig. 1, through connection of the wires 10. A master control switch for the system is used such as illustrated in the co-pending application above referred to, and which is a stationary contact illustrated diagrammatically in Fig. 1 at 27 which is provided with a plurality of stationary contacts 28 arranged in a predetermined manner, as shown in Fig. 1, for control by a movable contact member indicated in dotted lines at 29 which carries a plurality of contacts 30 thereon for engagement with the contacts 28 in a predetermined manner.

The contacts 30 are arranged in two rows as illustrated in Fig. 1, as are the contacts 28, and corresponding rows of the contacts 30 are adapted for engagement with the adjacent rows of the contacts 28, the diagrammatic illustration being made with contacts shown in offset relation merely for the purpose of illustration, so that it may be clearly understood how certain connection between the several contacts are made through the operation of the master control switch.

The usual ignition switch used on motor vehicles is represented diagrammatically at 31 which is provided with a terminal 32 connected by wire 33 with a suitable source of energy 34 at the positive terminal thereof, while the negative terminal is connected to a ground on the frame of the vehicle at 35 in the usual manner. This ignition switch has a suitable contact illustrated diagrammatically at 36 which closes the circuit between the terminal 32 and terminal 37. Through the operation of the switch 31, by closing the circuit at 36, energy is supplied through wire 33 through the circuit wire 38 which extends to one of the contacts 28 on the lower portion of the stationary contact plate 27 and when the movable contact member 29 is set in the position illustrated in Fig. 1 for operation of the alarm circuit, energy is supplied through the contact 30 and electrical connection therebetween to the circuit wire 39 connected with one terminal of the armored shell 40 within the armor casing 41 while the opposite terminal thereof is connected to the ground as indicated at 42, which completes the circuit to the source of energy.

In addition, a portion of the energy from the wire 38 closed through the wire 43 to the electrical magnetic circuit closer 34 and through the winding 45 thereof to the wire 46. This wire 46 is connected to another of the stationary contact points 28 and through the connection of contact 30 the circuit is completed through the wire 47 to the ground, thus energizing the electro-magnetic switch attracting the armature 48 to engage the end of the core 49 and thereby further close the circuit between the source of energy and the armor cell 40 through the wire 50.

From this description, it will be understood that any movement of the ignition switch 31 which will always operate the switch 36 so that the circuit controlled by the switch 36 is closed will immediately when the movable contact member 29 is set in the position shown in Fig. 1, energize the alarm circuit and operate the independent supply circuit through the energization of the electro-magnetic switch 44, and in this way subsequently movement of the switch 31 will not break the circuit to the alarm and it will therefore continue to operate until the lock operated switch 29 is moved to break the circuit.

The operation of the contact member 29 is controlled by a suitable key operated lock in order to prevent unauthorized operation of the alarm and ignition. When the movable member 29 of the master switch 27 is set at its opposite position of movement, the circuit through wire 51 will be closed while all other circuits will be broken in order that current from the battery 34 through the ignition switch 31 controlled by the contact 36 may be closed for supplying current to the ignition circuit 52 of the motor vehicle to permit the usual operation thereof.

When the alarm system is set to prevent operation of the vehicle by unauthorized persons as above described, the circuit closer construction heretofore described and forming part of this invention also controls the alarm circuit through the wire connection 52 with one of the wires 10 connecting the contacts 9, with the wire 33 extending to the source of energy, while the remaining contacts connected by an independent wire for each of the switches is connected by the wire 53 to wire 38 included in the alarm circuit.

It will thus be clearly understood that raising of the hood 2 from the closed position will permit the coiled spring 22 to move the operated rod member 17 upwardly from the set position shown in Fig. 6, to that shown in Fig. 4 so that the contact rollers 12 will engage the stationary contacts 9 and close the circuit therebetween, thus energizing the alarm circuit as well as the circuit to the magnetically operated switch 44 for further energizing the alarm circuit to retain it continuously closed until properly operation of the master switch.

From the above description, it should therefore be clear that a highly practical and novel circuit closer construction has been provided for use in conjunction with a burglar alarm system as above set forth in which the circuit control through the raising of the hood will be affected in a simple and efficient manner through this novel switch construction, wherein all parts are concealed and of a simple and efficient construction to insure long life with efficient operation and wherein the parts may be made and assembled at a relatively small cost.

Having thus described our invention, what we claim as new is:—

A circuit closer comprising a stationary casing, a rod slidably arranged in the casing with one end extending outwardly therefrom, through which said rod may be operated, a pair of spaced apart stationary contact members arranged in the casing, circuit wires attached thereto, a movable contact carried by the rod and arranged to close the circuit between said stationary contacts during a predetermined period of the movement of the rod and comprising an arm, a clamp at one end of the arm for attaching to said rod, a roller support pivotally mounted at the outer end of the arm, a contacting roller mounted on one end of said support for engagement with said stationary contact, and spring means attached to the opposite end of said support yieldably urging the roller into contacting position, said contacts being disposed out of engagement upon the movement of the rod into either of its extreme opposite positions, and spring means arranged in the casing and connected to the rod for yieldably urging the rod outwardly of the casing.

In testimony whereof we affix our signatures.

FRANK KUDRNA, Jr.
NICHOLAS YIRKOSKY.